(12) United States Patent
Shirato et al.

(10) Patent No.: US 9,089,460 B2
(45) Date of Patent: Jul. 28, 2015

(54) PUSHCART

(71) Applicant: Murata Manufacturing Co., Ltd., Kyoto (JP)

(72) Inventors: Kenichi Shirato, Kyoto (JP); Shigeru Tsuji, Kyoto (JP); Masayuki Kubo, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/657,014

(22) Filed: Mar. 13, 2015

(65) Prior Publication Data
US 2015/0182393 A1    Jul. 2, 2015

Related U.S. Application Data

(63) Continuation of application No. PCT/JP2013/073080, filed on Aug. 29, 2013.

(30) Foreign Application Priority Data

Sep. 18, 2012  (JP) ................................. 2012-203852

(51) Int. Cl.
*B62D 51/04* (2006.01)
*A61G 5/04* (2013.01)
(Continued)

(52) U.S. Cl.
CPC *A61G 5/04* (2013.01); *G05B 15/02* (2013.01); *G05D 1/0891* (2013.01); *A61G 2005/1089* (2013.01)

(58) Field of Classification Search
CPC ...... B62D 51/04; B62D 51/06; B62D 51/005; B62D 61/00; B62D 1/14

USPC ........................ 180/19.1, 19.2, 19.3
See application file for complete search history.

(56) References Cited

U.S. PATENT DOCUMENTS 3,872,945 A * 3/1975 Hickman et al. ............. 180/65.6
4,280,578 A * 7/1981 Perkins ......................... 180/6.5
(Continued)

FOREIGN PATENT DOCUMENTS

JP    2002-282314 A    10/2002
JP    2009-83774 A      4/2009
(Continued)

OTHER PUBLICATIONS

English translation of Written Opinion of the International Search Authority for Application No. PCT/JP2013/073080 dated Oct. 8, 2013.

*Primary Examiner* — Tony Winner
(74) *Attorney, Agent, or Firm* — Pearne & Gordon LLP (57) ABSTRACT

A pushcart in which a user can adjust a balance direction based on his/her own sense even on a slope. The pushcart includes a pair of wheels, driving units, a pair of wheels are supported on a main body unit in a rotatable manner, a grip portion provided on another side of the main body unit, and a support portion that is connected to the main body unit on one side so as to be capable of rotating in a pitch direction and supports assist wheels in a rotatable manner on another side. An angle formed between the main body unit and a direction orthogonal to the ground surface is estimated based on detected angle between the main body and the support portion. An attitude of the main body unit in the pitch direction is controlled based on a target pitch angle corrected using a correction value.

8 Claims, 11 Drawing Sheets

(51) Int. Cl.
  *G05B 15/02*  (2006.01)
  *G05D 1/08*  (2006.01)
  *A61G 5/10*  (2006.01)

(56) References Cited

U.S. PATENT DOCUMENTS

5,168,947 A * 12/1992 Rodenborn ............... 180/19.1
5,390,753 A *  2/1995 Parker ...................... 180/19.1
6,378,833 B1 *  4/2002 Ries ........................... 248/640
2003/0010546 A1 *  1/2003 Roberts ...................... 180/65.1
2008/0231006 A1 *  9/2008 Van Eeden ................ 280/7.15
2010/0193264 A1 *  8/2010 Kurek ........................ 180/19.1
2012/0029696 A1  2/2012 Ota et al.
2013/0041507 A1  2/2013 Ota et al.

FOREIGN PATENT DOCUMENTS

JP    2012-35076 A    2/2012
WO   2012-114597 A    8/2012

* cited by examiner

PUSHCART

BACKGROUND OF THE INVENTION

1. Field of the Invention

The present invention relates to pushcarts capable of preventing falls in a pitch direction.

2. Description of the Related Art

Many walking assistance vehicles have been developed thus far as devices for assisting the elderly, the disabled, and so on in walking. Many conventional walking assistance vehicles are configured having four wheels or eight wheels in order to prevent falls during walking, and stability during walking is increased by providing carrying bags or the like and lowering the center of gravity of the walking assistance vehicle.

Walking assistance vehicles in which an oil damper is provided in a wheel axle are also being developed for the purpose of preventing a user from falling when the user is on a sloped surface such as a hill or the like and has picked up more speed than intended. For example, Patent Document 1 discloses a walking assistance vehicle configured with an oil damper, whose resistance increases corresponding to the rotational speed of a rotational shaft, affixed to a wheel; the rotational shaft is connected to the wheel axle, and thus the rotation of the wheel can be restricted, which makes it difficult for the vehicle to pick up speed.

Patent Document 1: Japanese Unexamined Patent Application Publication No. 2002-282314

BRIEF SUMMARY OF THE INVENTION

In the walking assistance vehicle disclosed in Patent Document 1, the oil damper, whose resistance increases along with the rotational speed of the rotational shaft, is affixed to a wheel, and the rotational shaft is connected to the wheel axle; accordingly, the oil damper can suppress the body of the vehicle from moving forward by itself when traveling down a hill. On the other hand, the oil damper continually imparts an arresting force on the rotation of the wheel, even when traveling on level ground, and there has thus been a problem in that a burden is continuously placed on the user, who cannot move without applying a greater force than is originally necessary.

Having been achieved in light of these circumstances, it is an object of the present invention to provide a pushcart in which a walking-assisted subject can adjust a balance direction based on his/her own sense, even in the case where a ground surface is sloped.

To achieve the aforementioned object, a pushcart according to the present invention includes a pair of wheels, one or more driving units that rotate the pair of wheels, a main body unit on one side of which the pair of wheels are supported in a rotatable manner, a grip portion provided on another side of the main body unit, a support portion that is connected to the main body unit on one side so as to be capable of rotating in a pitch direction and supports one or a pair of assist wheels in a rotatable manner on another side, a control unit that controls operations performed by the one or more driving units, an angle detection means that detects an angle formed between the main body unit and the support portion, and an angle estimating means that estimates an angle formed between the main body unit and a direction orthogonal to a ground surface based on the angle detected by the angle detection means. Here, operation of the main body unit is controlled so that the angle formed between the main body unit and the direction orthogonal to the ground surface estimated by the angle estimating means takes on a target pitch angle that is a target for an angle of slope of the main body unit in the pitch direction, the pushcart further includes a correction value input accepting means that accepts an input of a correction value that corrects the target pitch angle, and an attitude of the main body unit in the pitch direction is controlled based on the target pitch angle corrected by the correction value whose input has been accepted.

According to the above configuration, the input of the correction value for the target pitch angle is accepted and the attitude of the main body unit in the pitch direction is controlled based on the target pitch angle corrected by the correction value whose input has been accepted, and thus a walking-assisted subject can vary the target pitch angle to serve as the balance direction of the main body unit according to his/her own sense in both the case where a ground surface has a slope and the case where the ground surface is level. For example, in the case where the input of the correction value has been accepted so that the target pitch angle shifts the main body unit toward the walking-assisted subject, or in other words, backward, "movement while braking" is possible, which makes it possible to travel in a stable manner without the main body unit moving forward on its own, even if the walking-assisted subject leans on the grip portion. On the other hand, in the case where the input of the correction value has been accepted so that the target pitch angle shifts the main body unit away from the walking-assisted subject, or in other words, forward, the main body unit moves so as to pull the walking-assisted subject. In addition, by changing the correction value based on the walking-assisted subject's preferences, the working conditions of the brake, a braking force that pulls the main body unit, and so on can be adjusted. Accordingly, an operational feeling that is comfortable for the walking-assisted subject can be achieved.

In the pushcart according to the present invention, it is preferable for the correction value input accepting means to include an operating portion capable of rotating central to a center axis of an area of the grip portion that is gripped.

According to the above configuration, by providing an operating portion that can rotate around the center axis of the area of the grip portion that is gripped, the walking-assisted subject can adjust the balance direction in accordance with the slope of the ground surface by rotating the operating portion while gripping the grip portion, which enables stable walking without causing the operation to feel unnatural.

In addition, in the pushcart according to the present invention, it is preferable for the correction value input accepting means to include an operating portion in which a plurality of buttons are disposed in the vicinity of an area of the grip portion that is gripped.

According to the above configuration, the operating portion in which a plurality of buttons are disposed is provided in the vicinity of the area of the grip portion that is gripped, and thus the balance direction can be adjusted in accordance with the slope of the ground surface in a short operating time, which enables stable walking without causing the operation to feel unnatural.

In addition, in the pushcart according to the present invention, it is preferable for the correction value input accepting means to accept the input of the correction value through an external terminal.

According to the above configuration, by accepting the input of the correction value through the external terminal, the balance direction can be adjusted in advance in accordance with the slope of a path that is expected to be walked on, which enables stable walking without causing the operation to feel unnatural.

In addition, in the pushcart according to the present invention, it is preferable for the correction value input accepting means to accept the input of the correction value in steps.

According to the above configuration, the input of the correction value is accepted in steps, and thus the balance direction can be adjusted in accordance with the slope of the ground surface with a simple operation, which enables stable walking without causing the operation to feel unnatural.

According to the above configuration, the input of the correction value for the target pitch angle is accepted and the attitude of the main body unit in the pitch direction is controlled based on the target pitch angle corrected by the correction value whose input has been accepted, and thus a walking-assisted subject can vary the target pitch angle to serve as the balance direction of the main body unit according to his/her own sense in both the case where a ground surface has a slope and the case where the ground surface is level. For example, in the case where the input of the correction value has been accepted so that the target pitch angle shifts the main body unit toward the walking-assisted subject, or in other words, backward, "movement while braking" is possible, which makes it possible to travel in a stable manner without the main body unit moving forward on its own, even if the walking-assisted subject leans on the grip portion. On the other hand, in the case where the input of the correction value has been accepted so that the target pitch angle shifts the main unit away from the walking-assisted subject, or in other words, forward, the main body unit operates so as to pull the walking-assisted subject. In addition, by changing the correction value based on the walking-assisted subject's preferences, the working conditions of the brake, a braking force that pulls the main body unit, and so on can be adjusted. Accordingly, an operational feeling that is comfortable for the walking-assisted subject can be achieved.

DETAILED DESCRIPTION OF THE INVENTION

A pushcart according to an embodiment of the present invention will be described in detail hereinafter based on the drawings.

Figure 1:
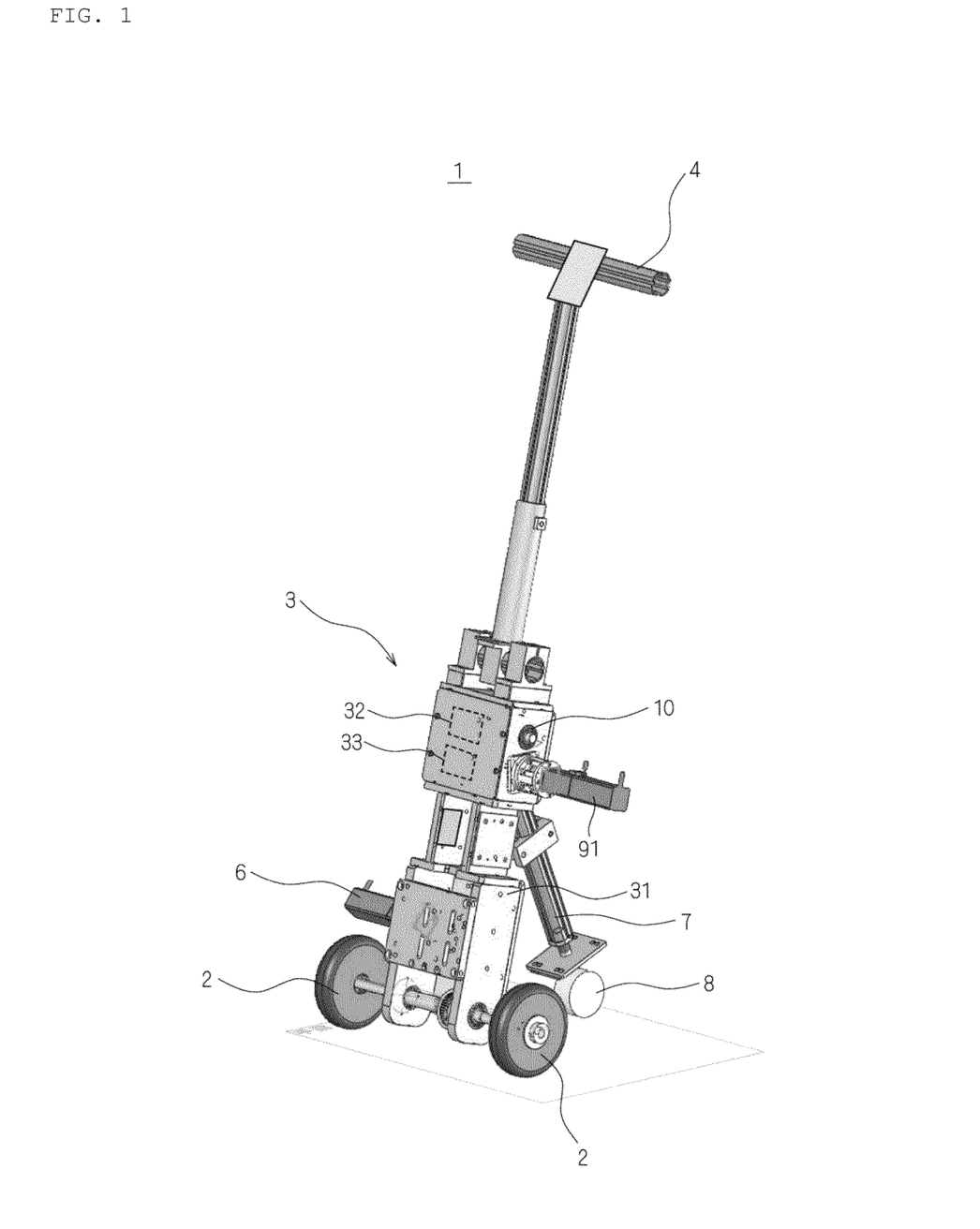
FIG. 1 is a perspective view illustrating the configuration of a pushcart according to an embodiment of the present invention.

FIG. 1 is a perspective view illustrating the configuration of the pushcart according to this embodiment of the present invention. In a pushcart 1 according to the present embodiment, a pair of wheels 2 is supported at one end (on one side) of a main body unit 3 so as to be capable of rotating, and an elderly person, a disabled person, or the like, serving as a walking-assisted subject, grips a grip portion 4 provided at one end (another side) of the main body 3, on the side opposite from the side on which the pair of wheels 2 is supported, and walks. Note that the grip portion 4 need not be provided at the one end, and may be provided partway along the main body unit 3.

Figure 2:
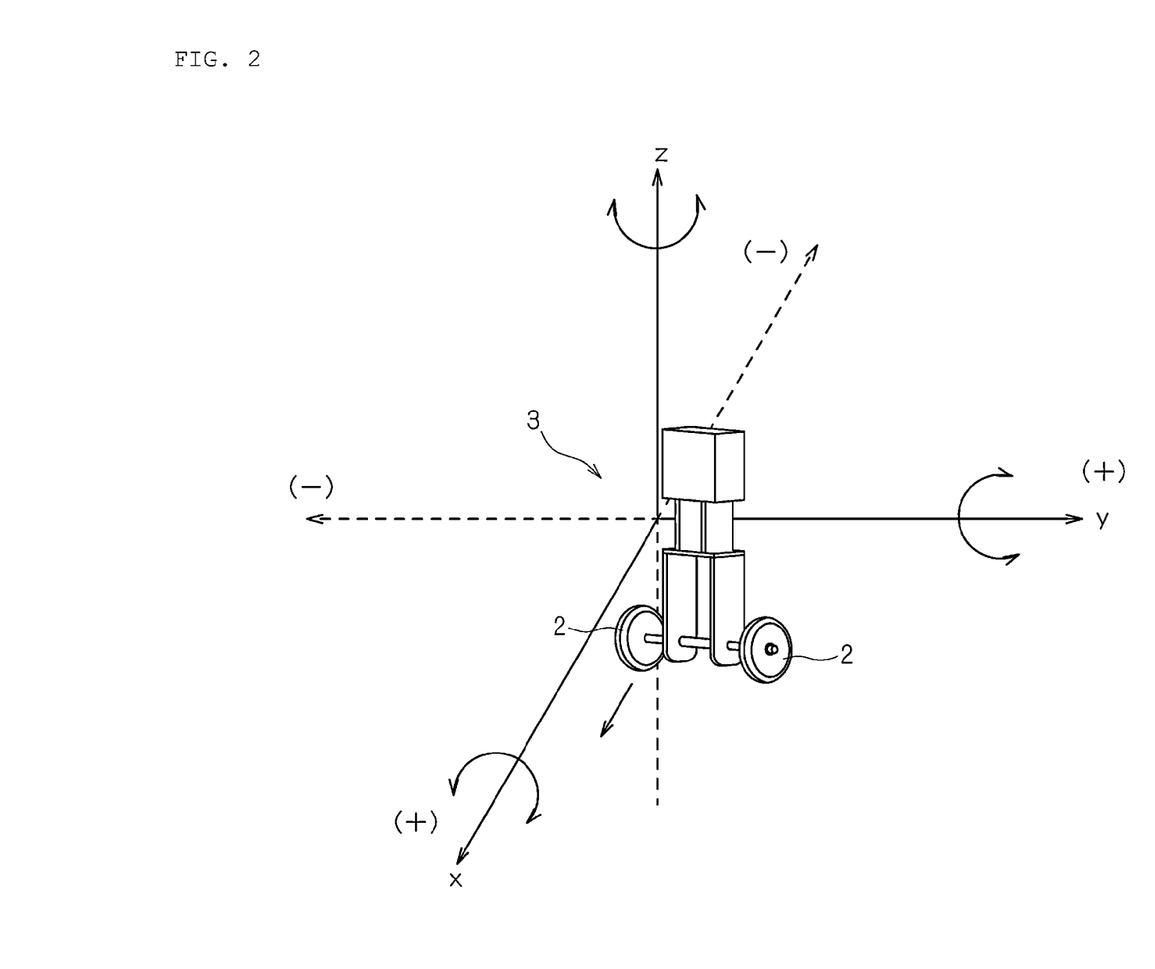
FIG. 2 is a schematic diagram illustrating a pitch direction, a roll direction, and a yaw direction.

A pitch direction will be clarified here. FIG. 2 is a schematic diagram illustrating a pitch direction, a roll direction, and a yaw direction. As illustrated in FIG. 2, in the case where the pushcart 1 moves along an xy plane, forward in a (+) direction along an x-axis or backward in a (−) direction along the x-axis, the pitch direction is a rotation direction central to a y-axis. The main body unit 3 tilts forward in the case where the wheels 2 face the (+) direction along the y-axis and the rotate counterclockwise, and the main body unit 3 tilts backward in the case where the wheels 2 face the (+) direction along the y-axis and rotate clockwise. The roll direction is a rotation direction central to the x-axis, and is a rotation direction in the case where the main body unit 3 swings in a left-right direction. Furthermore, the yaw direction is a rotation direction central to a z-axis, and is a rotation direction in the case where the orientation of the pair of wheels 2 is angled away from the x-axis direction.

As shown in FIG. 1, a pitch motor (driving unit) 6 that rotates the pair of wheels 2 is provided in the main body unit 3. The main body unit 3 and the pair of wheels 2 are connected by a frame 31 that supports the pair of wheels 2 in a freely rotatable state, and the rotation of the pitch motor 6 is transmitted to the pair of wheels 2 via belts or gears (not shown) provided in the main body unit 3. Note that the frame 31 is a part of the main body unit 3.

A control board (control unit) 32 that controls the operation (rotation) of the pitch motor 6 and a battery 33 are provided in the main body unit 3. The control board 32 includes a driver, an A/D converter, a D/A converter, a counter, a controller or the like that controls operations of the pitch motor 6, and so on. The controller is specifically a microprocessor, a CPU, an LSI, or the like. The pushcart 1 is controlled so as to balance in the pitch direction using reaction torque produced by the rotation of the pair of wheels 2.

The pushcart 1 according to the present embodiment also includes an assist wheel 8 for increasing stability while the walking-assisted subject is walking. The assist wheel 8 is rotatably supported by a support portion 7, which is connected at one end thereof to the main body unit 3 so as to be capable of pivoting in the pitch direction, on another end thereof. A single assist wheel 8 may be provided as illustrated in FIG. 1, or a pair of assist wheels 8 may be provided to increase stability in the roll direction. Note that it is not absolutely necessary for the support portion 7 to be connected to the main body unit 3 at one end, and a portion partway along the support portion 7 may be connected to the main body unit 3. In addition, it is not absolutely necessary for the assist wheel 8 to be supported on another end of the support portion 7, and the assist wheel 8 may be supported by an intermediate part of the support portion 7 as long as that part is within a range where another end of the support portion 7 does not make contact with the ground.

The location of a fulcrum 10 that serves as a rotational center of the support portion 7 is not particularly limited, as long as the fulcrum 10 is in the main body unit 3. This is because any location is acceptable as long as the main body unit 3 can be prevented from falling.

In the present embodiment, an angle formed between the support portion 7 and the main body unit 3 (called an angle of intersection hereinafter) θ1 is detected from a calculation based on an output (a pulse signal) from a support portion angle encoder (angle detection means) 91.

Figure 3:
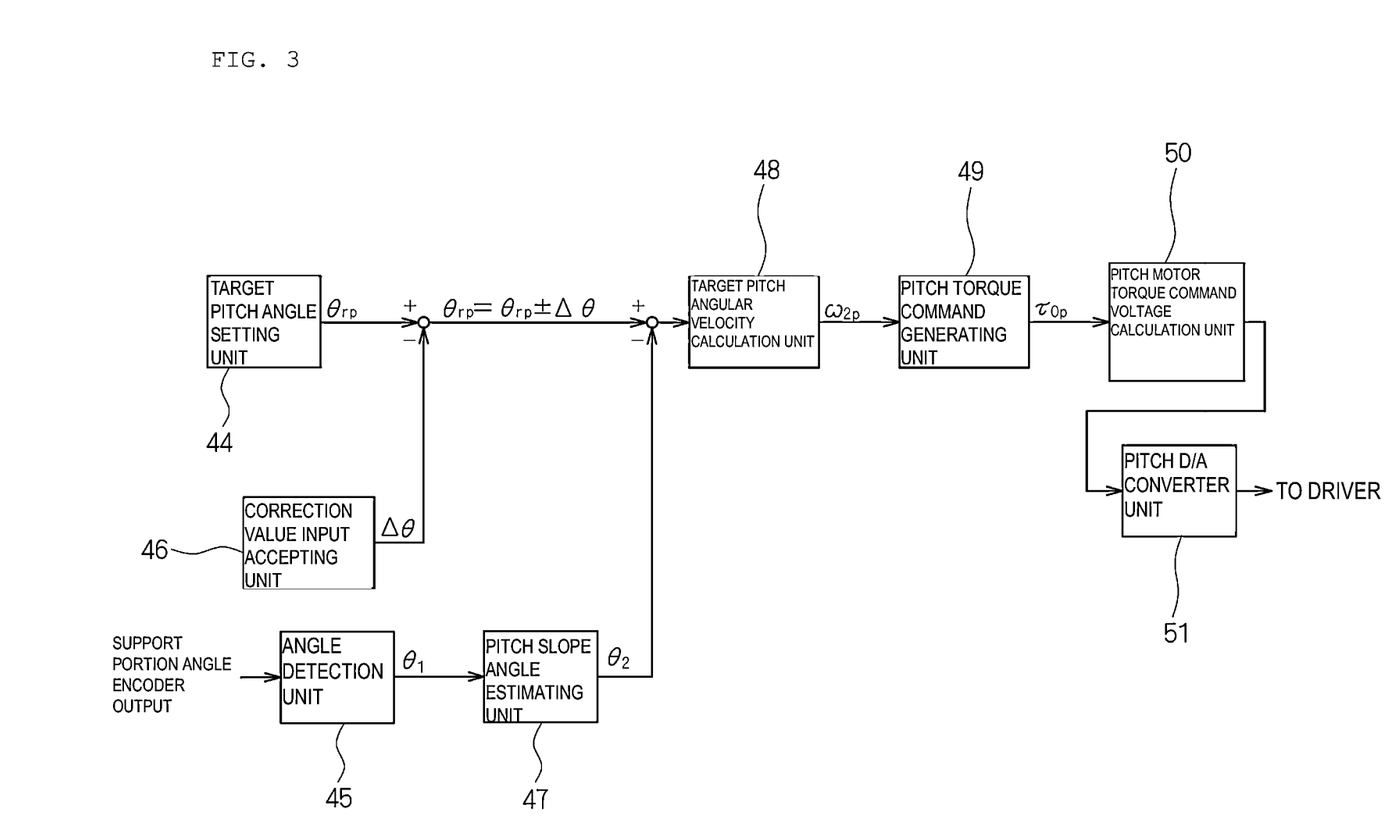
FIG. 3 is a control block diagram illustrating an example of control that prevents a pushcart according to an embodiment of the present invention from falling in a pitch direction.

FIG. 3 is a control block diagram illustrating an example of control that prevents the pushcart 1 according to this embodiment of the present invention from falling in the pitch direction. As illustrated in FIG. 3, a target pitch angle setting unit 44 accepts a setting for a target pitch angle $\theta_{rp}$ that serves as a target for an angle of slope in the pitch direction of the main body unit 3. A correction value input accepting unit 46 accepts an input of a shift amount for the target pitch angle $\theta_{rp}$ whose setting has been accepted by the target pitch angle setting unit 44. Specifically, an input of a correction value $\Delta\theta$ is accepted as the shift amount, and by adding/subtracting the correction value $\Delta\theta$ whose input has been accepted to/from the target pitch angle $\theta_{rp}$, a corrected target pitch angle $\theta_{rp}$ can be found ($\theta_{rp} = \theta_{rp} \pm \Delta\theta$).

Meanwhile, an angle detection unit 45 calculates the angle of intersection θ1, which is the angle formed between the main body unit 3 and the support portion 7, from the angle in the pitch direction, which is the output of the support portion angle encoder 91.

A pitch slope angle estimating unit (an angle estimating means) 47 estimates an angle of slope (pitch slope angle) θ2, which is an angle formed between the main body unit 3 and a direction orthogonal to the ground surface, based on the calculated angle of intersection θ1.

A target pitch angular velocity calculation unit 48 calculates a target pitch angular velocity $\omega_{2p}$ by multiplying a pitch angle deviation, obtained by subtracting an estimated absolute angle of slope from the target pitch angle $\theta_{rp}$ whose setting has been accepted, by a proportional gain. A pitch torque command generating unit 49 generates a pitch torque command $\tau_{0p}$ by, for example, performing PID control on the calculated target pitch angular velocity $\omega_{2p}$. A pitch motor torque command voltage calculation unit 50 calculates a command voltage by multiplying the pitch torque command $\tau_{0p}$ by a conversion coefficient. Finally, a pitch D/A converter unit 51 controls operations of the pitch motor 6 by outputting a D/A converted command voltage to a driver. Meanwhile, in the case where the pitch torque command generating unit 49 includes a detection means such as a gyrosensor that detects the angular velocity of the main body unit 3 in the pitch direction, the pitch torque command $\tau_{0p}$ may be generated through, for example, PID control carried out on a deviation between the target pitch angular velocity $\omega_{2p}$ and the pitch angular velocity obtained from the detection means.

A method for estimating the pitch slope angle θ2 will be described next. In the present embodiment, the pitch angle of slope θ2, which is an angle formed between the main body unit 3 and a direction orthogonal to the ground surface, is estimated based on the angle of intersection θ1, which is the angle formed between the main body unit 3 and the support portion 7.

Figure 4:
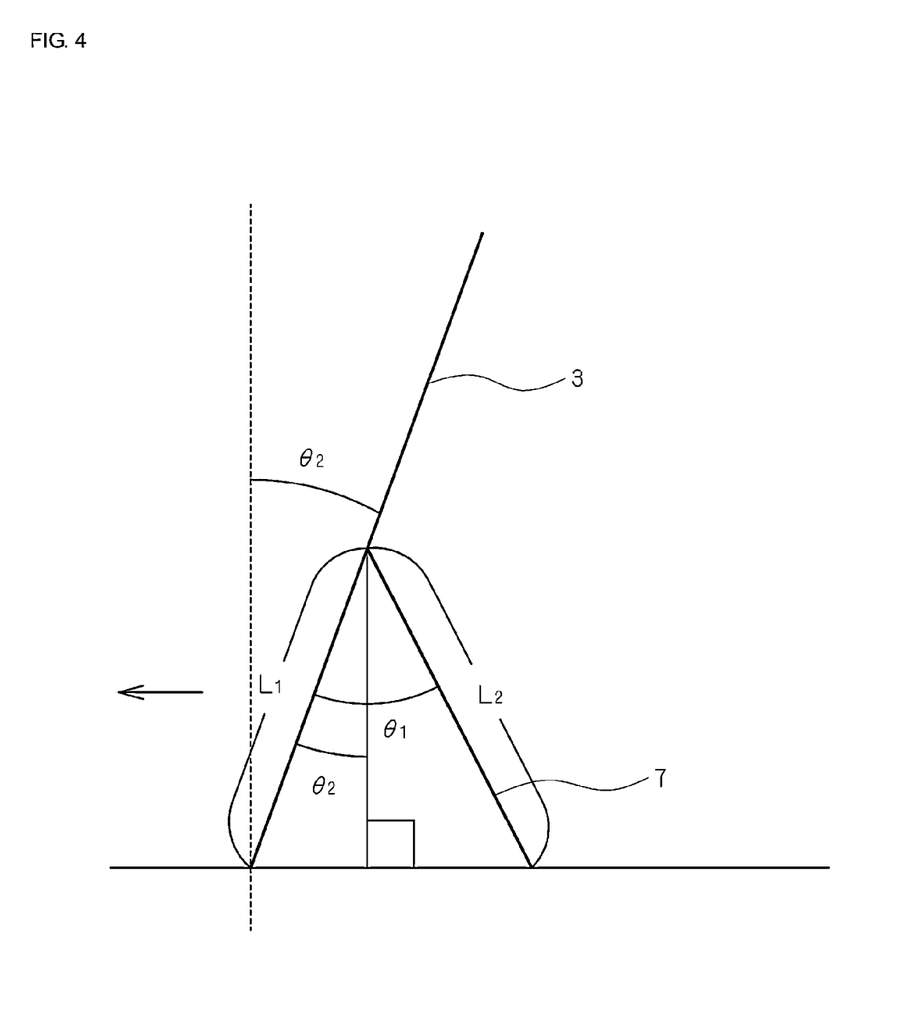
FIG. 4 is a schematic diagram illustrating a model of a pushcart according to an embodiment of the present invention, seen from the side.

FIG. 4 is a schematic diagram illustrating a model of the pushcart 1 according to this embodiment of the present invention, seen from the side. To simplify the descriptions, FIG. 4 schematically represents each location where the pair of wheels 2 and the assist wheel 8 make contact with the ground as matching each rotational center of the pair of wheels 2 and the assist wheel 8.

As illustrated in FIG. 4, the main body unit 3 is tilted so as to form the pitch angle of slope θ2 with the direction orthogonal to the ground surface. The support portion 7 supports the main body unit 3 in a tilted manner so that the angle of intersection θ1 is formed with the main body unit 3. In FIG. 4, the direction of an arrow pointing to the left corresponds to a forward direction of the pushcart 1, and the main body unit 3 is depicted as being tilted backward.

The angle of intersection θ1 varies depending on the angle (pitch slope angle) θ2 formed between the main body unit 3 and the direction orthogonal to the ground surface. This is because the support portion 7 is tilted so as to support the main body unit 3. However, a distance L1 from the location where the main body unit 3 makes contact with the ground to the intersection point with the support portion 7 and a distance L2 from the location where the support portion 7 makes contact with the ground to the intersection point with the main body unit 3 are constant, and thus as long as the pair of wheels 2 and the assist wheel 8 are in contact with the ground surface, the pitch angle of slope θ2 can be estimated geometrically.

In other words, a relationship indicated in Formula 1 can be derived from FIG. 4.

Formula 1

$$L_1 \cos\theta_2 = L_2 \cos(\theta_1 - \theta_2) \qquad \text{Formula 1}$$

The pitch angle of slope θ2 can be found by Formula 2 by solving Formula 1 for the pitch angle of slope θ2.

Formula 2

$$\theta_2 = \tan^{-1}\left(\frac{L_1 - L_2\cos\theta_1}{L_2\sin\theta_1}\right) \qquad \text{Formula 2}$$

However, the method for calculating the pitch angle of slope θ2 based on Formula 2 uses a trigonometric function, and thus has a comparatively high computation processing load and requires time to calculate; this method is therefore not suited to attitude control, which requires real-time functionality. Accordingly, in the present embodiment, the computation processing load is lightened and the time required for calculation is shortened by making a first-order approximation of a relationship between the angle of intersection θ1 and the pitch angle of slope θ2.

Figure 5:
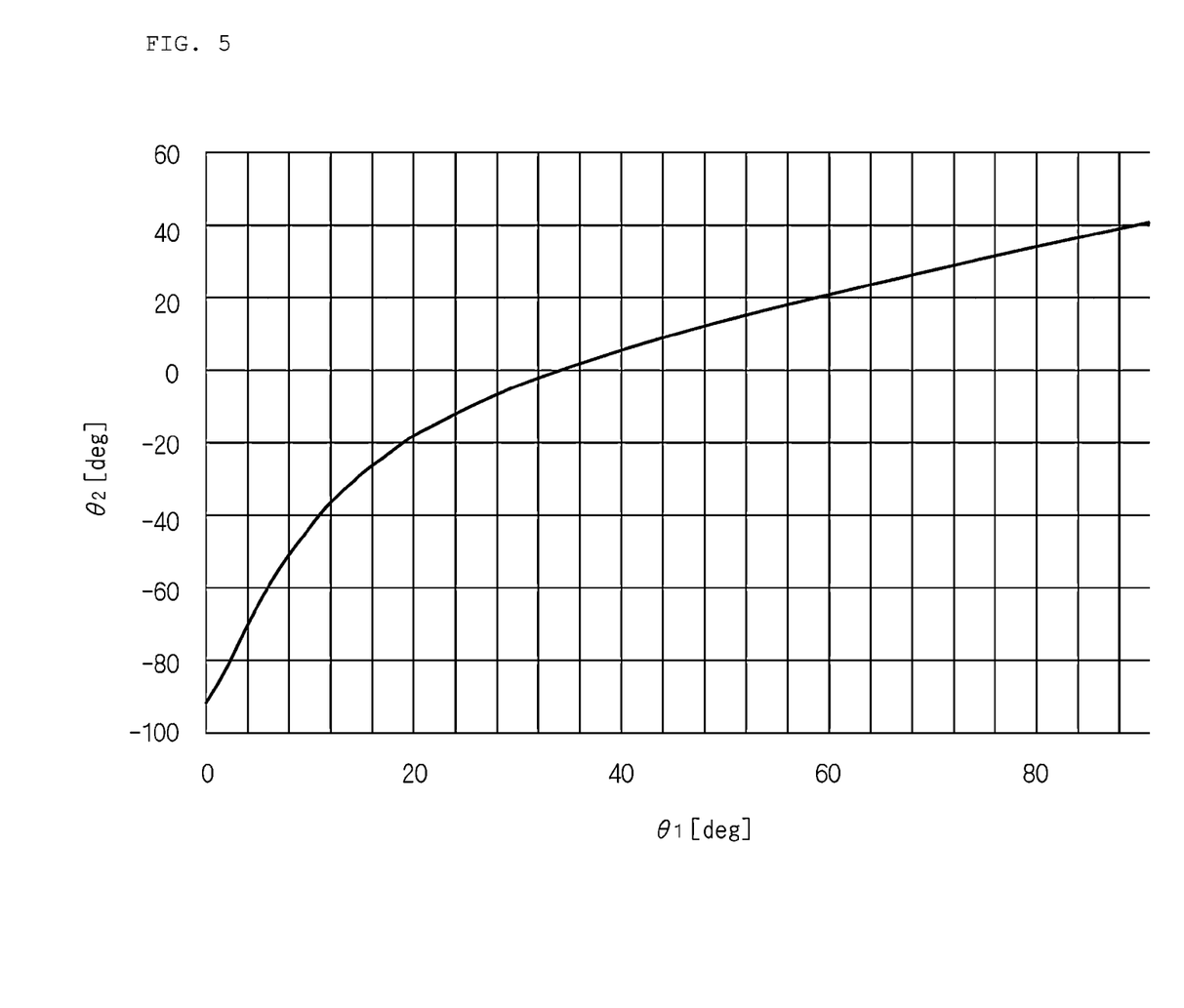
FIG. 5 is a graph illustrating a relationship between an angle of intersection and a pitch slope angle.

FIG. 5 is a graph illustrating the relationship between the angle of intersection θ1 and the pitch angle of slope θ2. In FIG. 5, the distance L2=1.2×the distance L1. As illustrated in FIG. 5, the pitch angle of slope θ2 varies greatly in areas where the angle of intersection θ1 is low, but in reality, there will be a loss in stability during walking when the angle of intersection θ1 is too low.

Figure 6:
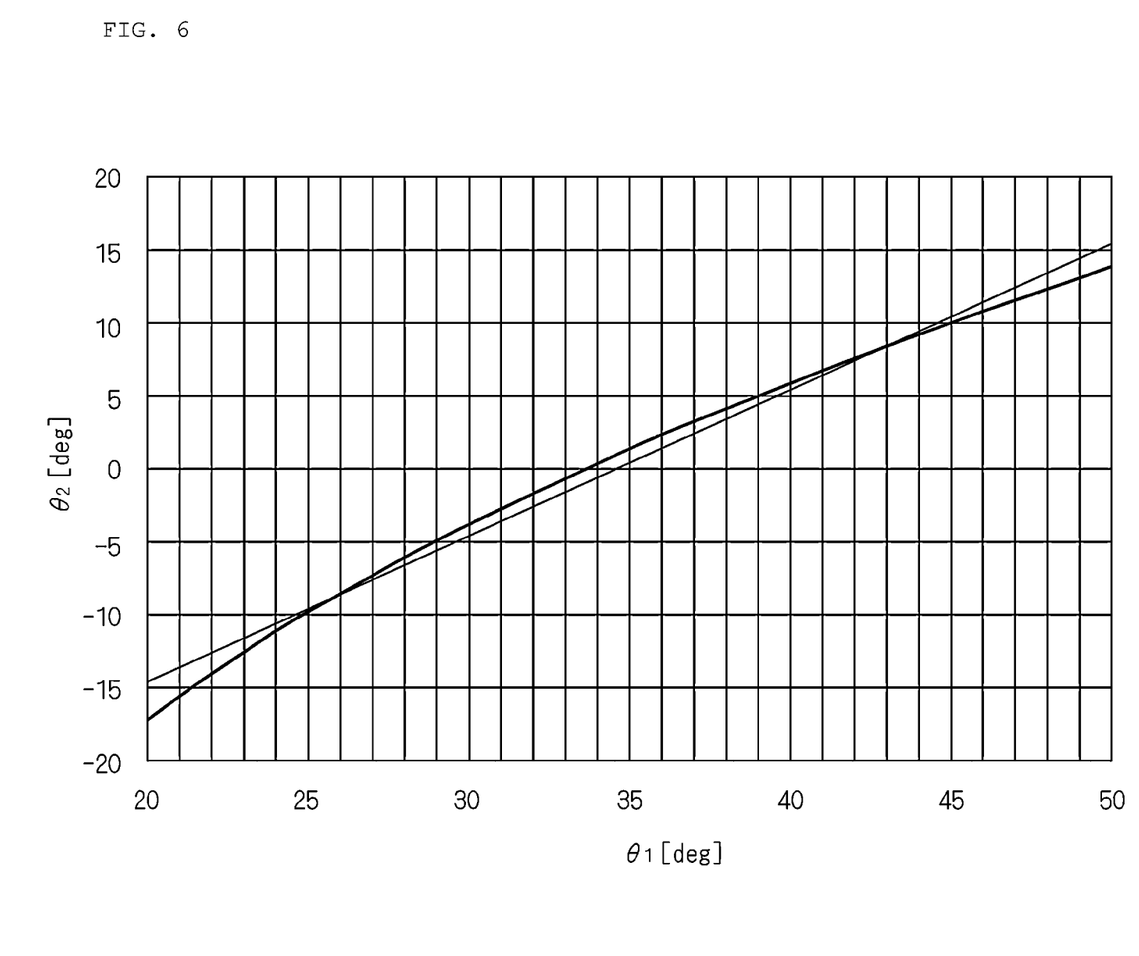
FIG. 6 is a graph illustrating a relationship between an angle of intersection and a pitch slope angle in the case where the angle of intersection varies from 20 degrees to 50 degrees.

Accordingly, in the present embodiment, the angle of intersection θ1 is assumed to vary from 20 degrees to 50 degrees, making it easy to make a first-order approximation of the relationship between the angle of intersection θ1 and the pitch angle of slope θ2. FIG. 6 is a graph illustrating the relationship between the angle of intersection θ1 and the pitch angle of slope θ2 in the case where the angle of intersection θ1 varies from 20 degrees to 50 degrees.

As illustrated in FIG. 6, a linear function of, for example, θ2=1.009×θ1−34.87 can be obtained by making a first-order approximation of the relationship between the angle of intersection θ1 and the pitch angle of slope θ2, and thus the pitch angle of slope θ2 can be estimated without causing the precision to drop.

Figure 7:
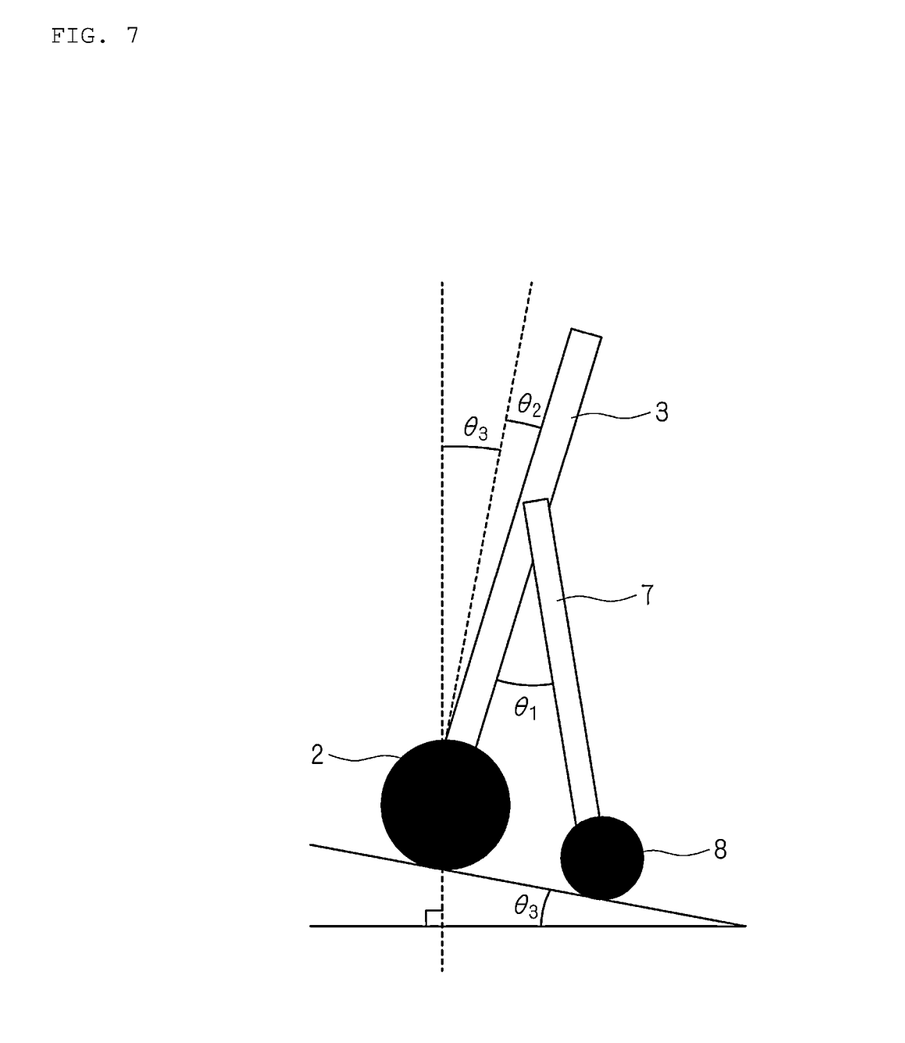
FIG. 7 is a schematic diagram illustrating a state in which a pushcart is in contact with the ground, in the case where a ground surface has a slope.

FIG. 7 is a schematic diagram illustrating a state in which the pushcart 1 is in contact with the ground, in the case where the ground surface has a slope. In FIG. 7, the ground surface of the pushcart 1 is an upward slope having an angle of slope θ3.

In this case, even if the pitch angle of slope θ2 is estimated through the aforementioned method, the angle will shift backward without taking on the balance direction of the pushcart 1. Accordingly, in the present embodiment, the walking-assisted subject adjusts the balance direction based on his/her own sense, and thus stable inverted two-wheel travel can be realized even in the case where the ground surface has a slope. To that end, the correction value input accepting unit 46 accepts the input of the correction value Δθ as the shift amount for the target pitch angle $\theta_{rp}$ whose setting has been accepted by the target pitch angle setting unit 44.

Figure 8:
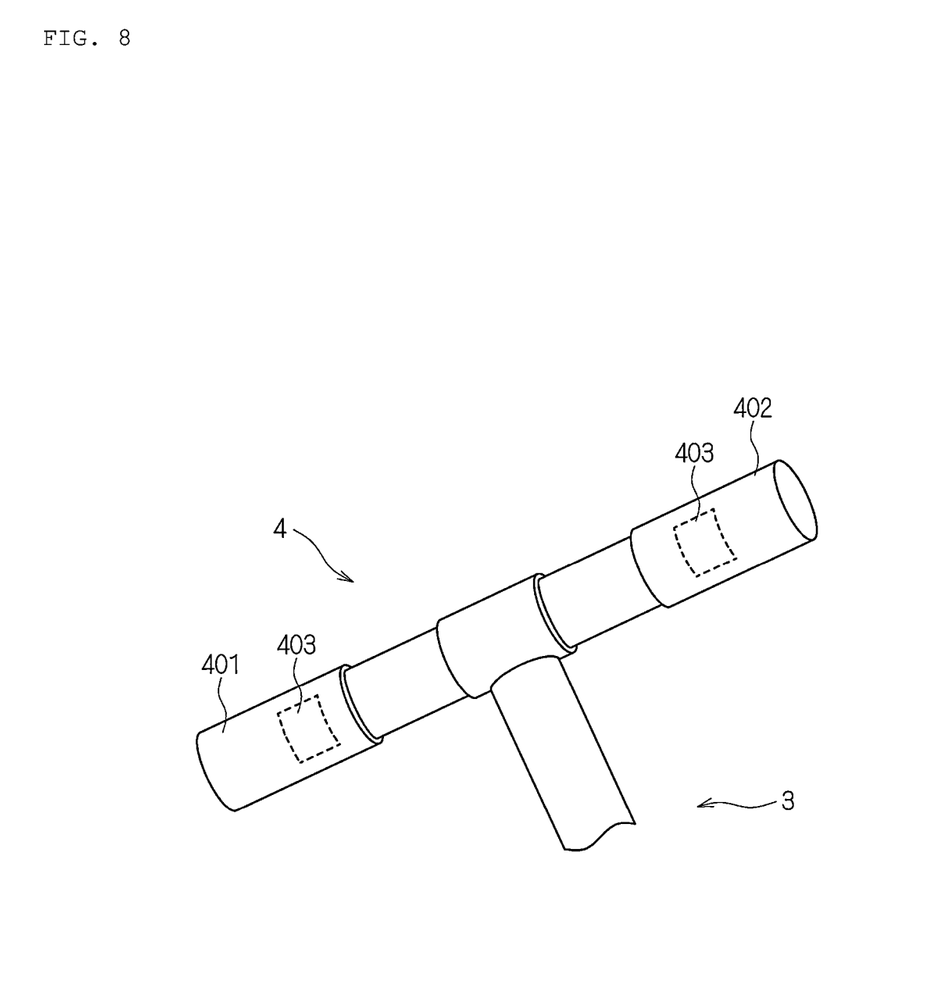
FIG. 8 is a schematic diagram illustrating the configuration of a grip portion in a pushcart according to an embodiment of the present invention.

The method for accepting the input of the correction value Δθ is not particularly limited. For example, operating portions capable of rotating central to a center axis of an area of the grip portion 4 that is gripped may be provided on both ends thereof, and the input of the correction value Δθ may be accepted based on a rotation angle of the operating portions. FIG. 8 is a schematic diagram illustrating the configuration of the grip portion 4 in the pushcart 1 according to this embodiment of the present invention.

As illustrated in FIG. 8, operating portions 401 and 402 capable of rotating central to the center axis of the area of the grip portion 4 that is gripped are provided on both ends thereof, and a rotation angle sensor 403, such as a potentiometer or the like, that detects the rotation angles of the respective operating portions 401 and 402 is provided.

The degrees and direction of rotation in the operating portions 401 and 402 are detected based on an output value from the rotation angle sensor 403, and the correction value Δθ and whether to add or subtract are determined based on the detected rotation direction and rotation angle.

Figure 9:
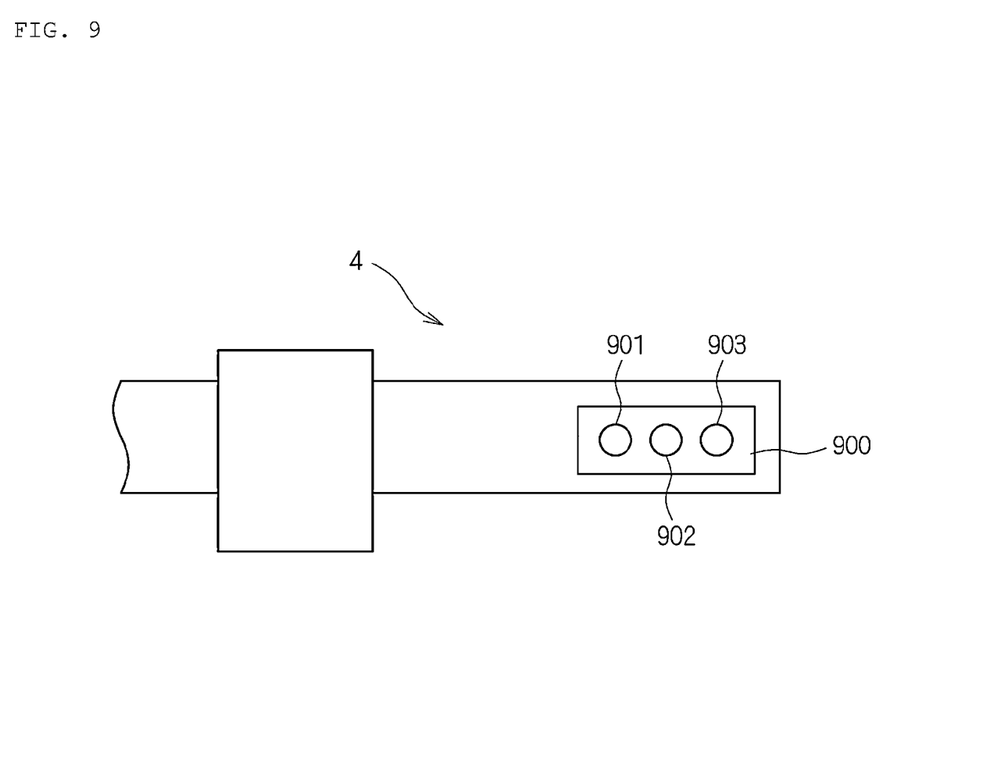
FIG. 9 is a schematic diagram illustrating another configuration of a grip portion in a pushcart according to an embodiment of the present invention.

Of course, the invention is not limited to the operating portions 401 and 402 capable of rotating central to the center axis of the area of the grip portion 4 that is gripped being provided, and an operating portion in which a plurality of buttons are disposed may be provided in the vicinity of the area of the grip portion 4 that is gripped. FIG. 9 is a schematic diagram illustrating another configuration of the grip portion 4 in the pushcart 1 according to this embodiment of the present invention.

In the example shown in FIG. 9, an operating portion 900 in which are disposed a plurality of buttons, for example, three buttons 901, 902, and 903, is provided in the vicinity of the area of the grip portion 4 that is gripped. The button 901 is a button for shifting the target pitch angle so that the main body unit 3 moves away from the walking-assisted subject, or in other words, shifts forward. Likewise, the button 902 is a button for resetting the target pitch angle to a default target pitch angle, and the button 903 is a button for shifting the target pitch angle so that the main body unit 3 moves toward the walking-assisted subject, or in other words, shifts backward.

In this manner, by the walking-assisted subject selecting the button 901 or the button 903 in accordance with the slope of the ground surface, the shift amount of the target pitch angle can be increased/reduced by a constant percentage, or in other words, the input of the correction value Δθ can be accepted in steps, only while the button is being pressed; this makes it possible for the walking-assisted subject to adjust the balance direction in accordance with the slope of the ground surface. The button 902 for resetting the target pitch angle to the default target pitch angle can be replaced by an operation in which the button 901 and the button 903 are pressed simultaneously, and thus it goes without saying that the button 902 is not necessary.

Figure 10:
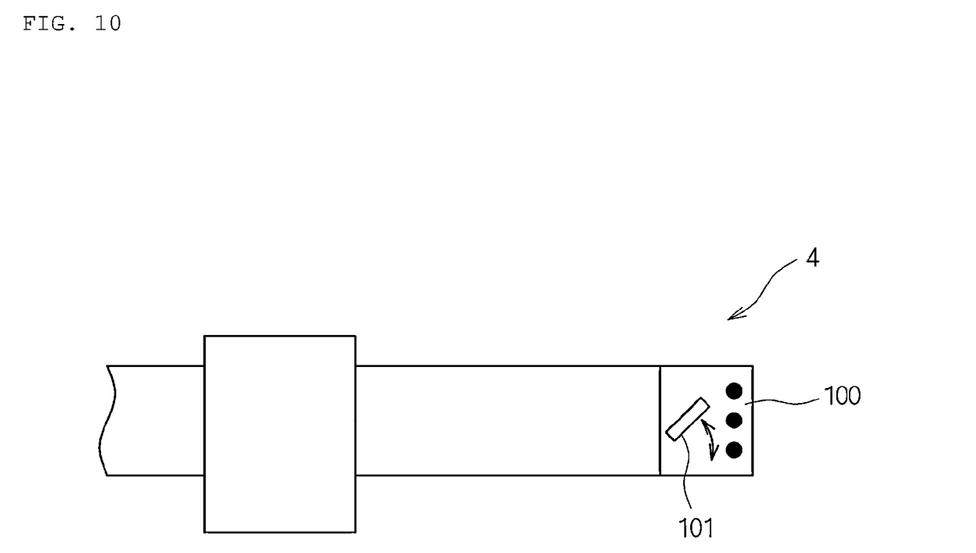
FIG. 10 is a schematic diagram illustrating another configuration of a grip portion in a pushcart according to an embodiment of the present invention.

FIG. 10 is a schematic diagram illustrating another configuration of the grip portion 4 in the pushcart 1 according to this embodiment of the present invention. In the example shown in FIG. 10, operating portions 100, in which is each disposed a rotating switch 101 capable of accepting the input of the correction value Δθ in steps, are provided on both sides in the vicinity of the area of the grip portion 4 that is gripped. The rotating switch 101 can be switched between three steps, namely shifting the target pitch angle forward by a constant angle, not shifting the target pitch angle, and shifting the target pitch angle backward by a constant angle. Meanwhile, like the button 901 and the button 903, the shift amount of the target pitch angle may be increased/reduced by a constant percentage based on an amount of time the rotating switch 101 is held at each rotation position. In other words, any configuration may be employed as long as the input of the correction value Δθ is accepted in steps. In this case, an intermediate position of the rotating switch 101 may be assigned to a function that maintains the corrected shift amount of the target pitch angle.

In this manner, by the walking-assisted subject switching the rotating switch 101, the input of the correction value Δθ can be accepted in steps, and thus the walking-assisted subject can adjust the balance direction in accordance with the slope of the ground surface.

Of course, the invention is not limited to accepting the input of the correction value Δθ in steps, and the input of the correction value Δθ may instead be accepted based on the rotation angle of the rotating switch 101.

Figure 11:
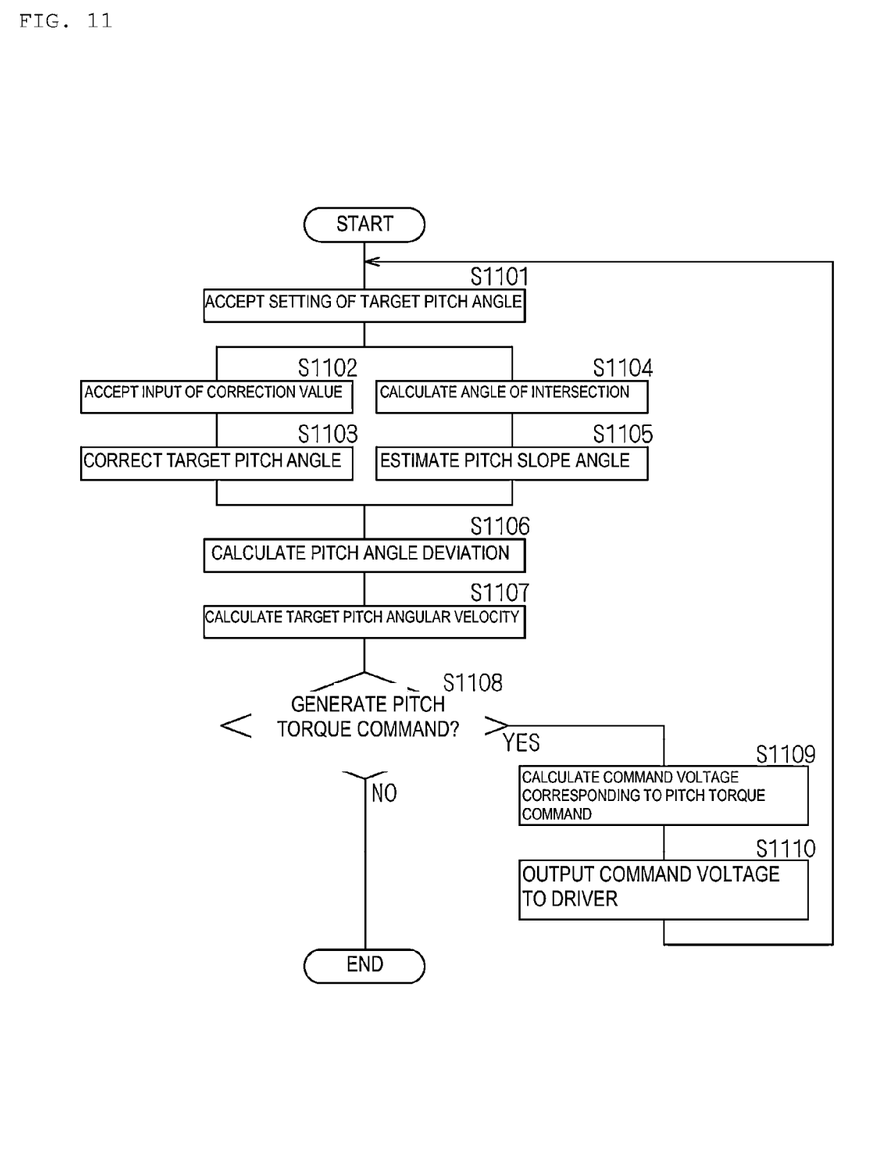
FIG. 11 is a flowchart illustrating a procedure, performed by a controller in a control board of a pushcart according to an embodiment of the present invention, that prevents falls in a pitch direction.

Next, an example of control of operations performed by the pushcart 1 illustrated in the control block diagram of FIG. 3 will be described based on a flowchart. FIG. 11 is a flowchart illustrating a procedure, performed by the controller in the control board 32 of the pushcart 1 according to this embodiment of the present invention, that prevents falls in a pitch direction.

As illustrated in FIG. 11, the controller of the control board 32 accepts the setting of the target pitch angle $\theta_{rp}$ that serves as a control target (step S1101). The controller accepts the input of the correction value Δθ that corrects the target pitch angle $\theta_{rp}$ (step S1102), and corrects the target pitch angle $\theta_{rp}$ by adding/subtracting the correction value Δθ whose input has been accepted to/from the target pitch angle $\theta_{rp}$ whose setting has been accepted (step S1103).

Based on the output of the support portion angle encoder 91, the controller calculates the angle of intersection θ1 that is the angle formed between the main body unit 3 and the support portion 7 (step S1104), and estimates the pitch angle of slope θ2 of the main body unit 3 based on the calculated angle of intersection θ1 (step S1105). The controller calculates the difference between the estimated pitch angle of slope θ2 and the corrected target pitch angle $\theta_{rp}$ as the pitch angle deviation (step S1106), and calculates the target pitch angular velocity $\omega_{2p}$ by multiplying the calculated pitch angle deviation by the proportional gain (step S1107).

The controller determines whether or not the pitch torque command generating unit 49 will generate the pitch torque command $\tau_{0p}$ through, for example, PID control carried out on the target pitch angular velocity $\omega_{2p}$ (step S1108). In the case where it is necessary to stop the control of operations performed by the pitch motor 6 for some reason, it is determined that the pitch torque command $\tau_{0p}$ will not be generated.

In the case where the controller has determined the pitch torque command $\tau_{0p}$ will be generated (step S1108: YES), the controller calculates the command voltage by multiplying the generated pitch torque command $\tau_{0p}$ by the conversion coefficient (step S1109). The controller D/A converts the calculated command voltage and outputs the command voltage that has undergone the D/A conversion to a driver that controls the operations performed by the pitch motor 6 (step S1110). The controller then returns the process to step S1101 and repeats the aforementioned processing.

On the other hand, in the case where the controller determines the pitch torque command $\tau_{0p}$ will not be generated (step S1108: NO), the controller stops the control of the operations performed by the pitch motor 6 and ends the processing. Through this, the commands to the pitch D/A converter unit 51 (the output of the command voltage) is stopped, and the control of the operations performed by the pitch motor 6 is stopped. A case such as where the power has been cut off during the control of operations performed by the pitch motor 6 or a user has supplied a stopping input via a switch or the like for stopping the control of the operations performed by the pitch motor 6, regardless of whether intentional or accidental, can be considered as the case where the controller determines the pitch torque command $\tau_{0p}$ will not be generated.

According to the present embodiment as described thus far, the input of the correction value $\Delta\theta$ that corrects the target pitch angle $\theta_{rp}$ is accepted and the attitude of the main body unit 3 in the pitch direction is controlled based on the target pitch angle $\theta_{rp}$ corrected by the correction value $\Delta\theta$ whose input has been accepted, and thus the walking-assisted subject can vary the target pitch angle $\theta_{rp}$ to serve as the balance direction of the main body unit 3 according to his/her own sense in both the case where the ground surface has a slope and the case where the ground surface is level. For example, in the case where the input of the correction value $\Delta\theta$ has been accepted so that the target pitch angle $\theta_{rp}$ shifts the main body unit 3 toward the walking-assisted subject, or in other words, backward, "movement while braking" is possible, which makes it possible to travel in a stable manner without the main body unit 3 moving forward on its own, even if the walking-assisted subject leans on the grip portion 4. On the other hand, in the case where the input of the correction value $\Delta\theta$ has been accepted so that the target pitch angle $\theta_{rp}$ shifts the main body unit 3 away from the walking-assisted subject, or in other words, forward, the main body unit 3 moves so as to pull the walking-assisted subject. In addition, by changing the correction value $\Delta\theta$ based on the walking-assisted subject's preferences, the working conditions of the brake, a braking force that pulls the main body unit 3, and so on can be adjusted. Accordingly, an operational feeling that is comfortable for the walking-assisted subject can be achieved.

It goes without saying that the aforementioned embodiment can be changed without departing from the essential spirit of the present invention. For example, the invention is not limited to a single pitch motor 6 being provided for a single pair of wheels 2, and a pitch motor may be provided for each wheel. Furthermore, a configuration in which the support portion 7 is disposed on the forward side, or in other words, a configuration in which the main body unit 3 is disposed between the support portion 7 and the walking-assisted subject, may be employed. In this case, expressions such as "forward" and "backward" may be interchanged as appropriate.

Furthermore, the input of the correction value $\Delta\theta$ may be accepted through an external terminal. "External terminal" refers to any terminal, wired or wireless, that can accept an input, using keys (buttons), a touch panel, or the like. Of course, the terminal is not limited thereto, and the terminal may accept the input through voice recognition, for example, using a specific phrase uttered by a person.

REFERENCE SIGNS LIST 1 pushcart
2 wheel
3 main body unit
4 grip portion
6 pitch motor (driving unit)
7 support portion
8 assist wheel
10 fulcrum
31 frame
32 control board (control unit)
33 battery
44 target pitch angle setting unit
45 angle detection unit
46 correction value input accepting unit
47 pitch slope angle estimating unit (angle estimating means)
48 target pitch angular velocity calculation unit
49 pitch torque command generating unit
50 pitch motor torque command voltage calculation unit
51 pitch D/A converter unit
91 support portion angle encoder (angle detection means)
100, 401, 402, 900 operating portion

The invention claimed is:
1. A pushcart comprising:
a pair of wheels;
one or more driving units that rotate the pair of wheels;
a main body unit on one side of which the pair of wheels are supported in a rotatable manner;
a grip portion provided on another side of the main body unit;
a support portion that is connected to the main body unit on one side so as to be capable of rotating in a pitch direction and supports one or a pair of assist wheels in a rotatable manner on another side;
a control unit that controls operations performed by the one or more driving units;
an angle detection means that detects an angle formed between the main body unit and the support portion; and
an angle estimating means that estimates an angle formed between the main body unit and a direction orthogonal to a ground surface based on the angle detected by the angle detection means,
wherein operation of the main body unit is controlled so that the angle formed between the main body unit and the direction orthogonal to the ground surface estimated by the angle estimating means takes on a target pitch angle that is a target for an angle of slope of the main body unit in the pitch direction;

the pushcart further comprises a correction value input accepting means that accepts an input of a correction value that corrects the target pitch angle; and an attitude of the main body unit in the pitch direction is controlled based on the target pitch angle corrected by the correction value whose input has been accepted.

2. The pushcart according to claim 1,
wherein the correction value input accepting means includes an operating portion capable of rotating around a center axis of an area of the grip portion that is gripped.

3. The pushcart according to claim 2,
wherein the correction value input accepting means accepts the input of the correction value in steps.

4. The pushcart according to claim 1,
wherein the correction value input accepting means accepts the input of the correction value through an external terminal.

5. The pushcart according to claim 4,
wherein the correction value input accepting means accepts the input of the correction value in steps.

6. The pushcart according to claim 1,
wherein the correction value input accepting means includes an operating portion in which a plurality of buttons are disposed in the vicinity of an area of the grip portion that is gripped.

7. The pushcart according to claim 6,
wherein the correction value input accepting means accepts the input of the correction value in steps.

8. The pushcart according to claim 1,
wherein the correction value input accepting means accepts the input of the correction value in steps.

* * * * *